United States Patent [19]

Satzger et al.

[11] Patent Number: 5,444,536
[45] Date of Patent: Aug. 22, 1995

[54] APPARATUS FOR MEASURING THE CURVATURE OF A PROFILE, SUCH AS AN EDGE OF A TURBINE BLADE

[75] Inventors: Wilhelm Satzger, Munich; Edmund Mangold, Ohlstadt, both of Germany

[73] Assignee: MTU Motoren- und Turbinen-Union Muenchen GmbH, Munich, Germany

[21] Appl. No.: 53,020

[22] Filed: Apr. 26, 1993

[30] Foreign Application Priority Data

Apr. 28, 1992 [DE] Germany .......... 42 13 909.0

[51] Int. Cl.$^6$ ................................ G01B 11/24
[52] U.S. Cl. .................................... 356/376
[58] Field of Search ..................... 356/375, 376

[56] References Cited

U.S. PATENT DOCUMENTS

| 4,657,394 | 4/1987 | Halioua . |
| 4,709,156 | 11/1987 | Murphy et al. . |
| 5,003,187 | 3/1991 | Zummbrunn et al. .......... 356/376 X |
| 5,067,817 | 11/1991 | Glenn ................... 356/376 |

FOREIGN PATENT DOCUMENTS

| 0318249 | 3/1989 | European Pat. Off. . |
| 2412359 | 9/1975 | Germany . |
| 2620330 | 11/1976 | Germany . |
| 3817561 | 11/1989 | Germany . |
| 0250505 | 11/1986 | Japan .................... 356/375 |
| 0182506 | 7/1988 | Japan .................... 356/376 |
| 0252208 | 10/1988 | Japan .................... 356/376 |

*Primary Examiner*—Richard A. Rosenberger
*Assistant Examiner*—K. P. Hantis
*Attorney, Agent, or Firm*—W. G. Fasse; W. F. Fasse

[57] ABSTRACT

The curvature profile of edges, such as trailing edges of propulsion plant blades or vanes is measured by a device that uses a laser beam for illuminating the curvature profile. The laser beam is generated by a laser that causes its beam to pass through a radiation intensity matrix arranged between the laser and the curvature profile. The radiation intensity matrix has locally different intensity values for varying the laser beam intensity over the cross-section of the laser beam. Sensors are so arranged that they sense the reflection values of the laser beam along the curvature profile of the profile edge. The outputs of the sensors are operatively connected to a central processing unit for ascertaining the curvature profile on the basis of the sensed reflection values. Thus, even sharp edges, such as knife edges, cutting tool edges, or propulsion plant blade edges can be checked for their current quality.

34 Claims, 2 Drawing Sheets

APPARATUS FOR MEASURING THE CURVATURE OF A PROFILE, SUCH AS AN EDGE OF A TURBINE BLADE

CROSS-REFERENCE TO RELATED APPLICATION

The present application relates to U.S. Ser. No. 08/053,156, filed on Apr. 27, 1993, and entitled: METHOD FOR MEASURING THE CURVATURE OF A PROFILE, SUCH AS AN EDGE OF A TURBINE BLADE.

FIELD OF THE INVENTION

The invention relates to an apparatus for measuring or surveying the curvature of a profile, such as an edge of a turbine blade, a cutting tool edge, or even a knife edge. Such measurements provide an information regarding the edge quality.

BACKGROUND INFORMATION

U.S. Pat. No. 4,657,394 (Halioua), issued on Apr. 14, 1987, discloses an apparatus and method for measuring three-dimensional surface contours, whereby phase measurements are taken of the deformed grating images and these phase measurements are used to perform an improved optical profilometry. Individual line profiles are obtained at a series of rotational increments of a body. A full 360° surface profile or a portion thereof can be generated by illuminating the three-dimensional image from a grating projector combined with a phase shifter and the reflected light is received by a linear array camera which provides output signals to an analog-to-digital converter and to a central processing unit which in turn provides respective output signals to a display.

U.S. Pat. No. 4,709,156 (Murphy et al.), issued on Nov. 24, 1987, discloses a method and apparatus for inspecting a curved three-dimensional surface, for example, in the form of a propulsion plant blade. Murphy et al. scan the surface with a laser beam and the beam reflected by the surface is received by a detector array or linear detector for ascertaining the curvature profile. The distance between locations at which the reflected light beams are focused on the linear detector corresponds to the distance at which points on the surface of the article are offset due to the curvature of the surface being scanned. This type of arrangement has the disadvantage that it cannot ascertain the quality of curvature profiles of sharp edges having curvature radii on the order of the cross-section of the illuminating laser beam. The Murphy et al. device is capable of scanning only slightly curved surfaces, for example, the surface of a blade or vane, but not the sharply curved edges of such a vane or blade, especially the trailing edge.

European Patent Publication 0,318,249 A2 (Penney et al.), published May 31, 1989, discloses a ranging system which provides a high speed read-out of a triangulation performed with the aid of a coded aperture light detector which provides a direct digital representation of the range or elevation of a surface spaced from the ranger. A light spot reflected by the scanned surface is optically spread into a line segment so that it can be shared among a number of light detection channels. The line of light falls on a coded aperture in front of a segmented fiber optic bundle and the light transmitted by each channel is lead to a separate photomultiplier or solid state detector. Every coded channel is constructed to give one bit of the digital address of the range position and a reference light value is obtained from another channel. Background reflections and secondary reflections are filtered out by focusing light scattered from the surface to a spot and passing it through a slit aperture oriented in the plane of triangulation before being spread to a line segment. Such a device is primarily used in a three-dimensional camera. German Patent Publication (DE-OS) 2,412,359 (Baerwinkel et al.), published on Sep. 25, 1975, discloses a method and apparatus for the contactless measuring or surveying of object contours. The object is illuminated with coherent light from two point-shaped light sources to form a three-dimensional interference field which in turn produces on the object being scanned an optical interference strip pattern that in turn is imaged onto an image plane by a central projection. An interference strip pattern is produced on a reference plane having at least three points with a known position. The data of the optical arrangement of the light sources, the imaging optic, and the image plane, are ascertained from the interference strip pattern from the imaging of said pattern and from the image of the known points. A non-expanded laser beam extending in the direction of the central vertical on a line connecting the two light sources marks the interference of null order. A computer calculates the position in space of the corresponding object points and thus the object contour on the basis of the coordinate of the image points and on the basis of the corresponding interference orders. Here again, very sharp contours cannot be imaged.

German Patent Publication (DE-OS) 2,620,330 (Hockley), published on Nov. 18, 1976, discloses a method and apparatus for determining a surface configuration. The Hockley apparatus includes an illuminating device which illuminates the surface to be measured or ascertained with an image. The image comprises straight parallel lines or strips that are light and dark so that a corresponding pattern is formed on the surface of the object. The configuration of the object surface distorts said pattern. A scanner and transducer scans the distorted pattern in order to follow a path along the surface and to produce a respective electrical output signal which indicates the variations in the surface illumination along the scanned paths, whereby these illumination changes are caused by the distortion of the strip pattern. Here again, there is room for improvement regarding the surveying of sharp edges.

German Patent Publication (DE-OS) 3,817,561 (Berger et al.), published on Nov. 30, 1989, discloses an apparatus for projecting an object grid pattern used for making topographic measurements on an object to be tested. The Berger et al. apparatus makes use of the "projection-Moiré-method". For this purpose a laser projects its light onto a two-beam interferometer having two mirrors and a beam divider. At least one of the mirrors is a mirror arrangement for producing curved wave fronts. One of the mirrors is a fixed spherical mirror and the other is an adjustable spherical mirror. A transversal displacement of the adjustable mirror makes it possible to adjust the grid constant of the object grid pattern. An axial displacement of the adjustable mirror provides for an adjustment of the phase position of the object grid pattern.

OBJECTS OF THE INVENTION

In view of the above it is the aim of the invention to achieve the following objects singly or in combination:
- to provide an apparatus for measuring or surveying a curvature profile that has a very small radius of curvature, such as may occur on edges, even sharp edges such as a knife edge, a tool cutting edge, or the trailing edge of a turbine blade;
- to provide an apparatus capable of measuring sharp curvature profiles having a curvature radius in the order of magnitude corresponding to the diameter of the laser beam that is used in the present apparatus for scanning the curvature profile;
- to permit the illumination of even sharp edges by a laser beam, the intensity of which locally modulated across the beam cross-section;
- to use a phase shifting algorithm for the correlation of the illuminating laser beam with the reflected laser beam; and
- to use a scanning head in which sensor elements are arranged in several rows or in several arrays for a three-dimensional scanning;

SUMMARY OF THE INVENTION

The apparatus according to the invention is characterized in that a locally adjustable or position adjustable radiation intensity matrix is arranged between the laser generator and the curvature profile to be illuminated by the respective laser beam so that the laser beam must pass through the matrix, whereby the laser beam has differing intensity values across its cross-section. The matrix is arranged at an angle relative to the laser beam axis for modifying the laser beam intensity across its cross-section. The angle may be a right angle or an acute angle. Sensor elements for sensing reflection values of the laser beam are arranged along the curvature profile of the edge to be scanned. The outputs of the sensor elements are operatively connected to a central processing unit for ascertaining the curvature profile on the basis of the sensed reflection values.

The apparatus according to the invention has the advantage that it is possible to modulate the intensity of the illuminating laser beam across the beam cross-section with the aid of the radiation intensity matrix. As a result, the laser beam that illuminates the curvature profile of the edge to be measured can be modified or marked continuously or in very fine steps in accordance with the pattern of the radiation intensity matrix which determines the beam intensity throughout the beam cross-section. Incidentally, the term "profile" as used herein shall mean curvature profile of the edge to be measured. Preferably, the intensity determining pattern or marking can be ascertained by locally illuminating the same spot on the profile with several different intensity values and then scanning the reflection values from the illuminated spots. The resulting reflection signals are then processed for correlating the markings and the corresponding profile spots. The reflected beam is advantageously scanned with the aid of sensors arranged in rows or arrays along the profile. This type of arrangement has the advantage that very sharp edges such as knife edges and even material removing cutting tool edges can be monitored for their quality. Even the trailing edge of turbine blades or vanes can be rapidly and cost effectively monitored for performing a quality testing.

In order to properly correlate the illuminating laser beam that has been marked by the radiation intensity matrix, to the reflected laser beam, the present apparatus comprises as part of its central processing unit, a computer with a memory having stored therein a computing program using a phase shifting algorithm. The use of such an algorithm has the advantage that only three measurements need to be made with different intensity values in order to correlate an illuminating beam portion with a respective reflected beam portion, and to ascertain the respective profile point or area for this marked beam portion.

The radiation intensity matrix may preferably be realized by arranging a transmission filter in the path of the laser beam from the laser generator to the profile. A transmission filter has the advantage that a mechanical displacement of the filter can provide several different intensity values over the laser beam cross-section. Such mechanical displacement or adjustment of the filter position can be achieved by a simple mechanical drive.

The radiation intensity matrix preferably comprises intensity values that rise or fall along a line extending at an angle relative to the laser beam axis. Such angle may be a right angle or an acute angle, whereby several, advantageously just two, local displacements of the matrix provide several, or three different, finely stepped intensity values of the illuminating beam. These finely stepped values mark the laser beam or a laser beam cross-sectional portion, such as a sector or segment. The mechanical adjustment device for the minimal displacement of the matrix may for example comprise a micrometer screw driven by a stepping motor, or the drive may be a piezo-ceramic device. Such devices have the advantage that they provide a rapid, yet precisely reproducible adjustment that can be electronically controlled.

According to a further preferred embodiment of the invention, the matrix incorporates different intensity values that follow a trigonometric function and which are locally adjustable. Such a matrix can be realized advantageously without the need for photographic or physically deposited opaquing or coloring devices which are conventionally used for transmission filters. Rather, according to the invention such a matrix is realized by a semipermeable mirror forming part of a modified Michelson interferometer.

The Michelson interferometer used according to the invention has been modified by the above mentioned semipermeable mirror. The mirror forms, from the laser beam, two partial radiated beams that are reflected as coherent light. These partial radiated beams are superimposed in the form of an interference image on the semipermeable mirror with the aid of adjustable partial beam mirrors to form the radiation intensity matrix. A first partial beam mirror is used for adjusting several intensity values by means of an angular adjustment. A second partial beam mirror permits adjusting intensity values by means of a linear spacing or positional adjustment. The just mentioned linear adjustment is preferably performed by a piezo-ceramic element. This type of construction according to the invention has the advantage of a compact structure for the radiation intensity matrix, whereby the periodicity and the intensity of the intensity values are accomplished either by a simple angular adjustment of the first partial beam mirror and/or by minimial displacements of the second partial beam mirror by means of the piezo-ceramic element. These variations in the intensity values are precisely obtained and the variations are consistently reproducible while all the components are assembled in an optimally small space to form a scanning head.

The sensor elements that are used according to the invention for sensing the reflected beam are preferably arranged in a row or array and an area type sensor may be formed by arranging a plurality of the arrays next to each other in columns in those instances where the laser beam permits a large surface area illumination. For this purpose the laser beam is preferably widened optically while maintaining the parallelism of the laser beam. The optical devices for widening the laser beam are preferably positioned between the laser generator and the radiation intensity matrix. Such devices have the advantage that in addition to a surface area scanning it becomes possible to especially enlarge the array width.

The sensor elements for sensing or scanning the reflection values of the laser beams are photosensitive elements, preferably photodiodes or photoresistor arrays or video camera arrays. The output of these sensors is supplied to a computer which calculates the profile. Such an arrangement according to the invention has the advantage that the reflection values are translated or transduced into electrically evaluatable signals locally close to the point of reflection, namely at the profile. Preferably, the transmission from the sensors to the computer is accomplished through movable, flexible electrical conductors which automatically feed the signals to the computer.

In another preferred embodiment of the invention the sensor elements are provided in the form of individual light conductor fibers forming a light conductor bundle, one end of which is arranged where the reflection takes place and the other end of which is arranged to feed into photosensitive elements and these elements again supply their output signals to the computer. This embodiment of the invention has the advantage that a large number of sensor elements can be arranged in rows or arrays along the profile, whereby the sensors can even follow the contour of the profile, since each individual light conductor fiber end can be positioned as is most advantageous for following the profile contour. In this instance the photosensitive elements are arranged upstream of the computer so that the arrangement for ascertaining the profile based on the reflection values comprises a combination of photosensitive elements and the computer.

In another preferred embodiment, the sensor elements for sensing the reflection values are mirrors which first detour the reflected laser beam in a line-by-line manner. The detouring takes place in a direction toward and onto photosensitive elements or light conductor fibers. This arrangement has the advantage that the mirrors can be positioned in a space saving manner and close to the point where the reflection of the laser beam takes place, namely close to the profile. In fact, it has been found that the mirrors can be positioned closer to the profile than is possible with photosensitive elements or with light conductor fibers.

In order to sense the profile in a three-dimensional manner, it is preferred to arrange the sensor elements in a sensing head in which the sensing elements are arranged in rows or arrays with a defined spacing relative to a scanning edge and so that the scanning head and the scanning edge are displaceable relative to the profile in parallel to the edge of the profile. This embodiment of the invention can be advantageously used for guiding the scanning head along a profile or vice versa. In both instances there will be relative movement between the profile and the scanning edge. Simultaneously and synchronously the scanned reflection values are processed for ascertaining the profile, more specifically, the quality of the profile.

The resulting output signal is preferably displayed on an image screen, permitting a three-dimensional display. Thus, the present apparatus is especially suitable for use as a test station in a production line for assuring the required quality. By allocating to each sensor element in the scanning head a horizontal segment or portion of the reflected laser beam it is possible to assemble these segments or portions through the computer for display on the image screen, thereby obtaining a dimensionally precise enlarged image of the profile.

In another embodiment the ends of light conductor fibers are positioned for receiving the reflected laser beam sections or portions individually. For this purpose, the fiber ends are positioned horizontally and at a right angle relative to the sharp profile edge, whereby the fiber ends surround the profile in the manner of a ring which is three quarters closed and one quarter open. In other words, the ring covers 270° and the profile reaches into the ring through the open sector. Thus, the profile can be advantageously placed within the ring for the scanning which increases the measuring precision and resolution. The scanning head can be of rather flat construction where light conductor fibers are used for receiving the reflected beam portions since the light conductor fibers themselves are rather thin.

In another preferred embodiment of the invention light conductor fibers are held in a scanning head, whereby the fibers extend vertically and in parallel to a scanning edge so that the fibers are oriented onto a ring-shaped mirror which encircles the profile through the required angle, for example, as a three quarters closed ring encircling the profile along a 270° range. The remaining sector of the ring remains open for the insertion of the profile. Additionally, the closed portion of the ring has an opening, e.g. in the form of a horizontal slot in the mirror surface, for the entry of the scanning laser beam. This feature has the advantage that only one line of the profile is illuminated at a time. This opening slot can form an interruption of the otherwise closed three quarter sector of the ring scanning head. Thus, the ring scanning head is divided into two portions by the beam entry slot and the scanning laser beam passes through the slot between the two portions of the scanning head to illuminate or scan the profile.

Preferably, further light fiber conductors are arranged in the scanning head for sensing reflected laser beam portions in the area of the opening slot. These additional light conductor fibers may be arranged in rows or arrays on both sides of the illuminating laser beam in the scanning head behind the ring. This arrangement is possible if the scanning head ring comprises light conductor fiber ends or if it comprises mirrors. In both instances the arrangement has the advantage that no point of the profile remains unscanned during the sensing operation.

The ring-shaped mirror is simultaneously angularly constructed so that the reflected laser beam is detoured from a row oriented horizontal direction into the direction of the light conductor fibers. In that case, the scanning head is not flat, but rather reaches around the profile like tongs. This arrangement has the advantage that the ends of the light conductor fibers face vertically downwardly so that they are protected against contamination and merely the relatively cost economical ring-shaped mirror needs to be replaced when it has become contaminated. Further, it is possible to provide additional protection against contamination by a protection disk arranged between the mirror and the light conductor fiber ends. In this type of construction, the scanning head can be hermetically sealed and filled with a protective gas to form an encapsulated and hence dust-free unit. The laser generator according to the invention is preferably a semiconductor laser which on the one hand provides the advantage of a compact volume and on the other hand can be constructed as a semiconductor laser row or array so that the profile can be illuminated line-by-line without any intermediate shutters or slots.

In order to avoid the need of an optical bench for the alignment of the laser beam from the laser generator onto the profile, it is preferable to use a light conductor fiber bundle between the laser generator output and the scanning head. This arrangement has the advantage that only flexible light conductor fibers leading to the scanning head are used, and the scanning head can thus easily follow the contour of the profile even if it involves a sharp edge and the scanning can take place in all three directions of space.

The invention achieves a further improvement if the radiation intensity matrix is constructed as a transmission filter or as a modified Michelson interferometer which is arranged in the scanning head. In this preferred embodiment, the radiation intensity matrix is arranged downstream of the light conductor fiber bundle as viewed in the direction from the laser generator to the scanning head, whereby a compact structure for the scanning head is an advantage.

In accordance with a further embodiment, specially constructed semiconductor lasers can be so miniaturized that they are preferably installed directly in the scanning head which avoids any optical bench and any light conductor fiber for directing the laser beam onto the profile. Such a structure makes the scanning head somewhat more complex, however the resulting compact structure of the scanning head increases its operability and the entire apparatus is improved, since any readjustment or fine adjustment outside the scanning head is avoided.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
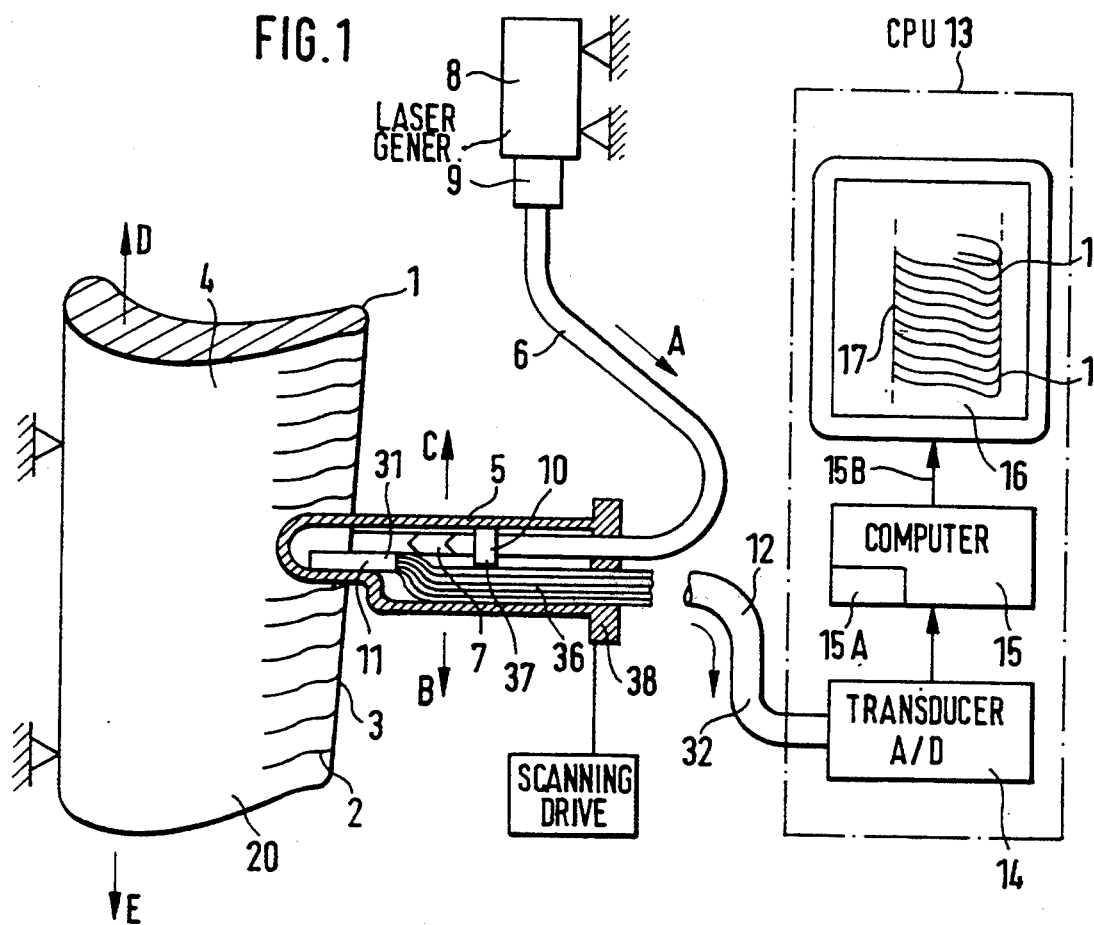
FIG. 1 illustrates schematically an apparatus according to the invention with a scanning head for measuring profiles, whereby the illustrated blade edge is scanned by relative movement between blade and head.

FIG. 1 illustrates an apparatus for measuring or scanning a profile 1 of an edge 2, such as the trailing edge 3 of a propulsion plant blade 4. The scanning is accomplished by a scanning head 5 which receives a laser beam 7 through a light conductor fiber bundle 6 from a laser generator 8 through an optical device 9 guiding the laser beam into the light conductor bundle 6 so that the beam will travel in the direction indicated by the arrow A. The purpose of the optical device 9 is to widen the laser beam 7.

According to the invention a radiation intensity matrix 37, for example in the form of a transmission filter 10, is arranged in the scanning head 5 between the light conductor fiber bundle 6 and the profile 1. The scanning head 5 comprises sensor elements 11 arranged in arrays for sensing reflection values of the laser beam 7 along the profile 1. Each sensor element 11 converts the incoming reflected light signal into a corresponding electrical signal that is transmitted individually through respective electrical conductors forming a bundle 12 connecting the scanning head 5 to a central processing unit 13 for ascertaining the profile 1 from the reflected values of the laser beam 7 as reflected by the profile 1 along the edge 2. The sensor elements 11 are, for example, photodiodes, photoresistors, or video camera arrays or light conductor fiber ends arranged in rows and feeding a converter.

The central processing unit 13 comprises a transducer 14 such as an analog-to-digital converter which transforms the incoming signals, be they optical or electrical, into digital signals useable as input signals for the computer 15 for calculating the measured contour. The computer 15 comprises a memory 15A having stored therein a computing program preferably based on a phase-shifting algorithm. The output 15B of the computer 15 is connected to the input of a display screen 16 capable of displaying a three-dimensional image 17 of the profile 1. However, the display does not need to be a screen 16. Instead of a screen, a printer and/or a plotter may be used for the graphical or numeric recording of the profile 1 as measured and calculated on the basis of the reflected laser beam signals.

Figure 2:
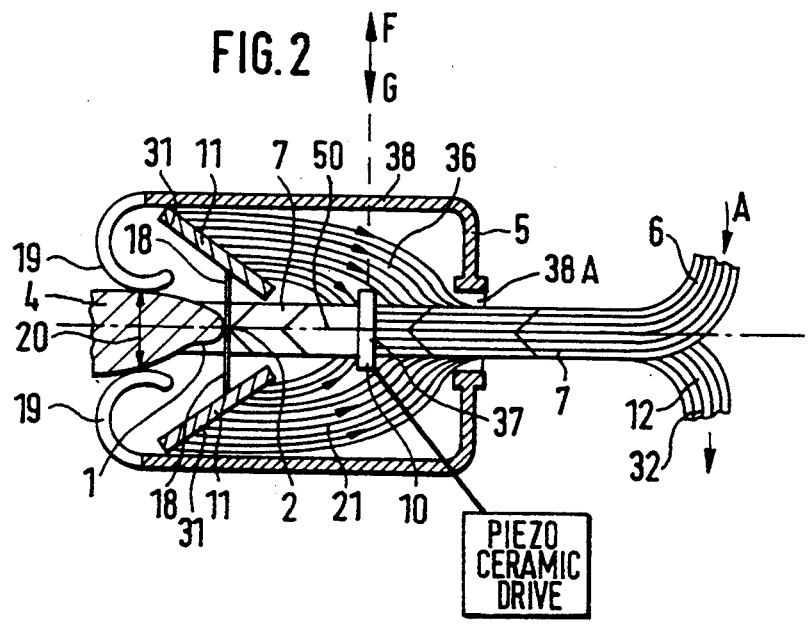
FIG. 2 shows a sectional view through the scanning head, whereby the sectional plane extends perpendicularly to the drawing plane in FIG. 1.

In the embodiments shown in FIGS. 1 and 2 a scanning drive moves the scanning head 5 either in the direction of the arrow B or in the direction of the arrow C along the profile 1, whereby the resulting signals processed in the central processing unit 13 provide the above mentioned three-dimensional image 17 of the profile 1 on the display 16. It is also possible to keep the scanning head 15 stationary and move instead the blade 4 with its edge 2 through the scanning head as indicated by the arrows D or E. The measurement or surveying of the profile 1 is accomplished regardless which of the elements 4 or 5 is moving relative to the other.

FIG. 2 shows the sectional view of the scanning head 5 which comprises a housing 38 having an opening 38A forming an inlet for the laser light conductors 6 and an outlet for the conductors 12. The housing 38 comprises further two curved spring elements 19 forming a scanning gap 20 arranged symmetrically relative to a central plane 50 extending perpendicularly to the sheet of the drawing. The profile 1 of the blade 4 is inserted into the scanning gap 20 as shown. The radiation intensity matrix 37 in the form of its transmission filter 10 is arranged centrally in the housing 38 of the scanning head 5 and the fiber light conductors 6 direct the laser beam 7 onto the transmission filter 10 which is arranged between the ends of the light conductor fibers 6 and the profile 1. In order to unmistakably correlate the laser beam portions of the illuminating laser beam with the corresponding laser beam portion reflected by the profile 1, it is necessary to adjust several radiation intensity values with the aid of the transmission filter 10. For this purpose the transmission filter 10 is adjustably mounted in the scanning head 5 so that it may be brought, for example, into three different positions by shifting it in the direction of the arrow F or in the direction of the arrow G. Such a shift can, for example, be accomplished by a piezo-electric ceramic drive symbolically shown in FIG. 2. Such drives are known as such.

Referring further to FIG. 2, the scanning head 5 has a scanning edge 18 that limits the penetration depth of the blade 2 into the scanning gap 20. The sensor elements 11 for sensing the reflection values reach above and below the scanning edge 18 so as to enclose the profile 1 as shown in FIG. 2. The above mentioned spring elements 19 that form the gap 20 make sure that the scanning head 5 is properly positioned relative to the blade 2. The signal conductors 21 and 36 for transmitting the reflected signals sensed by the sensors 11 are collected into a bundle 12 leading to the central processing unit 13.

Figure 3:
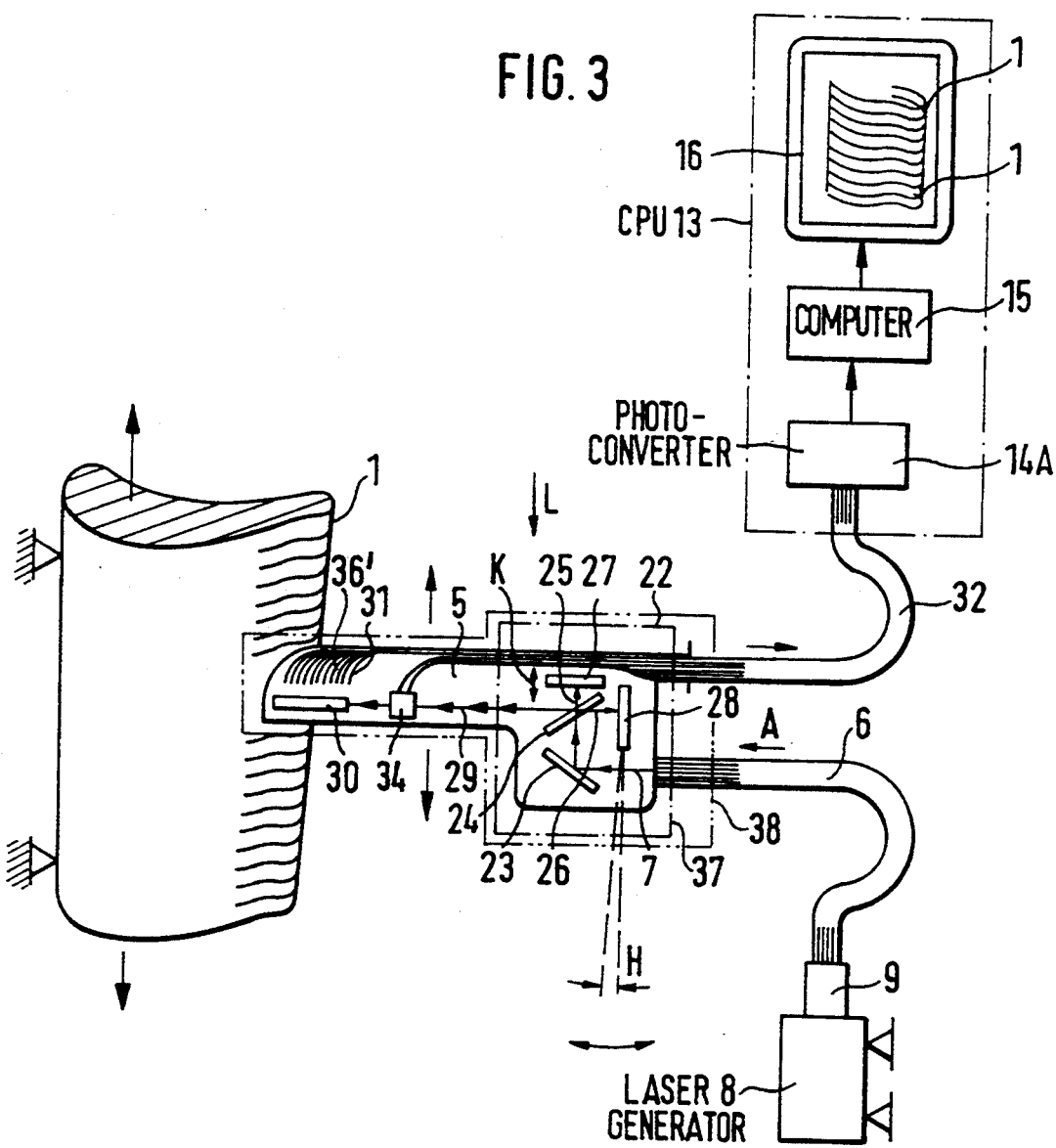
FIG. 3 is a view similar to that of FIG. 1, but showing a different scanning head using a modified Michelson interferometer.

FIG. 3 shows a scanning head 5 which comprises a Michelson interferometer 22 which has been modified as follows to function as a radiation intensity matrix 37. Optical elements are either included in the Michelson interferometer 22 or are positioned as shown at 9 at the output of the laser generator 8 for widening the cross-section of the laser beam 7. The laser generator 8 transmits the laser beam 7 through light conductor fiber bundle 6 and through a deflecting mirror 23 followed by a semipermeable mirror 24 functioning as the radiation intensity matrix. The semipermeable mirror 24 produces two coherent partial beams 25 and 26 which are reflected by mirrors 27 and 28 respectively back onto the semipermeable mirror 24, whereby an interference matrix is formed in the plane of the semipermeable mirror 24 by way of a superimposing of the reflected beams under an angle H, thereby forming an interference matrix that constitutes the radiation intensity matrix. The different intensity values necessary for the measuring or scanning of the profile 1 can be produced by adjusting either different angles H by tilting the partial beam reflecting mirror 28 or by minimal displacements of the partial beam mirror 27 in the direction of the arrow K. Such angular or linear adjustments are precisely reproducible, for example, by driving the mirrors 27, 28 with a conventional piezo-ceramic drive element shown as a block in FIG. 2.

The laser beam 29 downstream of the semipermeable mirror 24 has been modulated in accordance with the radiation intensity matrix formed in the modified Michelson interferometer 22. The laser beams reflected by the profile 1 are received by a curved mirror 30 to be described in more detail below with reference to FIG. 4. The mirror 30 deflects the received laser beams vertically into light conductor fiber ends 31 formed into a bundle 32 leading to the input of the central processing unit 13 which calculates the profile 1 from the reflection values as described above. For this purpose, a photo-converter or transducer 14A converts the reflected light signals into electrical signals. The converter 14A may, for example, comprise a video camera array to produce input signals for the computer 15, which in turn supplies the calculated results to the display 16 as described. An analog-to-digital conversion takes place simultaneously.

Figure 4:
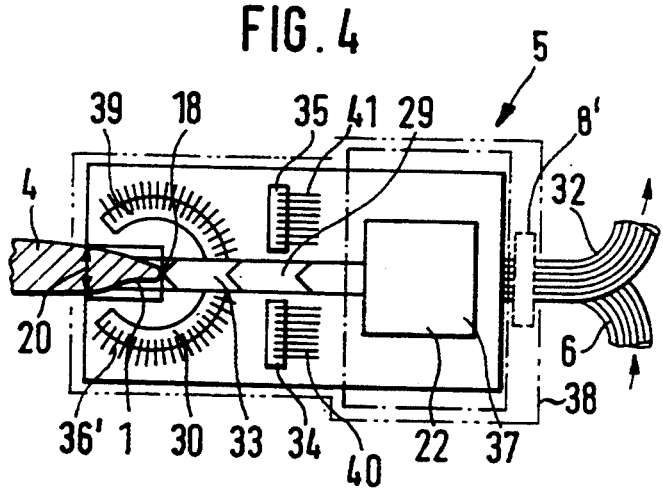
FIG. 4 shows a view similar to that of FIG. 2, but illustrating a view of the scanning head in the direction of the arrow L in FIG. 3.

FIG. 4 shows schematically further details of the scanning head 5 in its housing 38, wherein the curved mirror 30 and the modified Michelson interferometer 22 are mounted. The mirror 30 has the shape of a 270° ring 39 which substantially surrounds the scanning gap 20 into which the profile 1 of the blade 4 is inserted for measurement. The above mentioned scanning edge 18 limits the extent to which the profile 1 can be inserted into the gap 20 as described. The reflector plane of the mirror 30 is slanted, for example by 45° relative to the array plane so that the reflected laser beams are diverted vertically. An opening 33, such as a slot, is provided in the curved mirror 39 so that the illuminating, incoming laser beam 29 that has been modulated in accordance with the radiation intensity matrix fully illuminates the profile 1.

The depth of the scanning gap 20 is limited, as mentioned, by the scanning edge 18 in such a way that the ring-shaped mirror 30 encircles that part of the profile 1 that is to be scanned.

Additional light conductor fiber arrays 34 and 35 with respective light conductors 40 and 41 are arranged in such a position on both sides of the incoming modulated laser beam 29 that they can receive reflected values coming through the opening 33. All light conductor fibers 36' are collected in a light conductor fiber bundle 32 leading from the scanning head 5 to the photoconverter 14A in the central processing unit 13.

As an alternative embodiment, dashed lines in FIG. 4 show a semiconductor laser 8' arranged directly within the scanning head 38.' When the laser 8' is arranged directly in the scanning head 38, the light conductor fibers 6 external to the scanning head are omitted.

Although the invention has been described with reference to specific example embodiments it will be appreciated that it is intended to cover all modifications and equivalents within the scope of the appended claims.

What we claim is:

1. An apparatus for measuring a curvature profile of an edge, comprising a laser generator for producing a laser beam for illuminating said edge, a radiation intensity matrix arranged in the path of said laser beam between said edge and said laser generator for varying the laser beam intensity over the cross-section of said laser beam, wherein said radiation intensity matrix extends at an angle relative to a laser beam axis and the position of said radiation intensity matrix is adjustable, said apparatus further comprising receiver elements arranged and adapted to receive reflection values of reflected laser beams reflected from said edge, said receiver elements being arranged in rows or arrays along said edge, a central processing unit for calculating said curvature profile from said reflection values, signal conductor means operatively connecting said receiver elements to said central processing unit, a scanning head for physically receiving and at least partially surrounding said edge, wherein said scanning head comprises an edge locating member for physically locating said edge, said receiver elements are arranged as arrays or rows in said scanning head, said receiver elements have a defined spacing from said edge locating member, and said scanning head together with its edge locating member is displaceable parallel to said edge.

2. The apparatus of claim 1, wherein said receiver elements are photosensitive sensors that convert said reflection values into an electrical signal, wherein said signal conductor means comprise electrical conductors, and wherein said central processing unit comprises a computer with a memory.

3. The apparatus of claim 1, wherein said receiver elements comprise light conductor fiber ends of light conductor fibers and said signal conductor means comprise a light conductor bundle made up of said light conductor fibers, and wherein said central processing unit comprises a computer and a converter, wherein said converter comprises photosensitive elements for converting light signals coming in on said light conductor fibers into corresponding electrical input signals for said computer.

4. The apparatus of claim 1, wherein said receiver elements comprise a reflector mirror and at least one of light conductor fibers or photosensitive elements arranged in a row or array and said reflector mirror is adapted to deflect said reflected laser beams onto said at least one of light conductor fibers or photosensitive elements.

5. The apparatus of claim 1, wherein said central processing unit (13) comprises a computer having a memory, and wherein a computing program including a phase shifting algorithm is stored in said memory.

6. The apparatus of claim 1, wherein said radiation intensity matrix comprises intensity values that increase or decrease along a direction extending at an angle to said laser beam axis, wherein said angle is equal to or less than 90°.

7. The apparatus of claim 1, wherein said radiation intensity matrix comprises locally differing intensity values that differ according to a trigonometric function.

8. The apparatus of claim 1, wherein said radiation intensity matrix comprises a transmission filter.

9. The apparatus of claim 8, further comprising a piezo-ceramic drive arranged to adjust the position of said transmission filter thereby adjusting a plurality of transmission value intensities for said illuminating laser beam.

10. The apparatus of claim 1, wherein said radiation intensity matrix comprises a modified Michelson interferometer including a semipermeable mirror for forming two coherent light partial beams from said illuminating laser beam, said apparatus further comprising first and second adjustable partial beam mirrors for superimposing said partial beams on said semipermeable mirror to produce said radiation intensity matrix in the form of an interference image, and further comprising angular position adjustment means for adjusting the angular position of said first partial beam mirror and a piezo-ceramic device for a linear position adjustment of said second partial beam mirror.

11. The apparatus of claim 10, wherein said receiver elements and said modified Michelson interferometer are arranged in said scanning head.

12. The apparatus of claim 1, wherein said receiver elements of said scanning head are arranged to receive respective portions of said reflected laser beams, said portions being reflected in respective circular sectors of a circle around said edge in a plane orthogonal to said edge.

13. The apparatus of claim 12, wherein said receiver elements together receive said reflected laser beams over said circular sectors totalling at least 90° around said edge.

14. The apparatus of claim 13, wherein said circular sectors together total at least 160° around said edge.

15. The apparatus of claim 1, wherein said laser generator is a semiconductor laser arranged within said scanning head.

16. The apparatus of claim 1, further comprising an optical device for widening said laser beam, said optical device being arranged between said laser generator and said radiation intensity matrix.

17. The apparatus of claim 1, further comprising a light conductor fiber bundle arranged between said laser generator and said radiation intensity matrix.

18. An apparatus for measuring a curvature profile of an edge, comprising a laser generator for producing a laser beam for illuminating said edge, a radiation intensity matrix arranged in the path of said laser beam between said edge and said laser generator for varying the laser beam intensity over the cross-section of said laser beam, wherein said radiation intensity matrix extends at an angle relative to a laser beam axis and the position of said radiation intensity matrix is adjustable, said apparatus further comprising receiver elements arranged and adapted to receive reflection values of reflected laser beams reflected from said edge, said receiver elements being arranged in rows or arrays along said edge, a central processing unit for calculating said curvature profile from said reflection values, signal conductor means operatively connecting said receiver elements to said central processing unit, a scanning head in which said receiver elements are arranged, wherein said receiver elements comprise light conductor fiber ends of light conductor fibers for transmitting said reflection values of said reflected laser beams received by said fiber ends, wherein said fiber ends are arranged in a plane perpendicular to said edge in the shape of a partial ring partially surrounding and enclosing said edge, wherein said ring has an opening for said illuminating laser beam to pass through and has a scanning gap in which said edge is received.

19. The apparatus of claim 18, wherein said scanning head further comprises an at least partially ring-shaped mirror at least partially surrounding and enclosing said edge, said light conductor fibers extend at least partly parallel to said edge, said light conductor fiber ends face said ring-shaped mirror, said ring-shaped mirror has an opening for said illuminating laser beam, and said ring-shaped mirror has a partial ring-shaped mirror surface sloping concentrically at an angle to a plane perpendicular to said edge so that said ring-shaped mirror deflects said reflected laser beams from an orientation perpendicular to said edge into an orientation of said light conductor fibers parallel to said edge.

20. The apparatus of claim 18, wherein said scanning head comprises further light conductor fibers positioned for receiving a portion of said reflected laser beams that passes through said opening for said illuminating laser beam.

21. The apparatus of claim 18, wherein said scanning gap has an angular size of about 90° measured as a circular arc in a plane perpendicular to said edge.

22. The apparatus of claim 19, wherein said ring-shaped mirror extends over a circular arc of about 270° including said opening for said illuminating laser beam.

23. The apparatus of claim 18, wherein said signal conductor means comprise a light conductor bundle made up of said light conductor fibers, and wherein said central processing unit comprises a computer and a converter, wherein said converter comprises photosensitive elements for converting light signals coming in on said light conductor fibers into corresponding electrical input signals for said computer.

24. The apparatus of claim 18, wherein said receiver elements further comprise a reflector mirror arranged to deflect said reflected laser beams onto said light conductor fiber ends.

25. The apparatus of claim 18, wherein said central processing unit comprises a computer having a memory, and wherein a computing program including a phase shifting algorithm is stored in said memory.

26. The apparatus of claim 18, wherein said radiation intensity matrix comprises intensity values that increase or decrease along a direction extending at an angle to said laser beam axis, wherein said angle is equal to or less than 90°.

27. The apparatus of claim 18, wherein said radiation intensity matrix comprises locally differing intensity values that differ according to a trigonometric function.

28. The apparatus of claim 18, wherein said radiation intensity matrix comprises a transmission filter.

29. The apparatus of claim 28, further comprising a piezo-ceramic drive arranged to adjust the position of said transmission filter thereby adjusting a plurality of transmission value intensities for said illuminating laser beam.

30. The apparatus of claim 18, wherein said radiation intensity matrix comprises a modified Michelson interferometer including a semipermeable mirror for forming two coherent light partial beams from said illuminating laser beam, said apparatus further comprising first and second adjustable partial beam mirrors for superimposing said partial beams on said semipermeable mirror to produce said radiation intensity matrix in the form of an interference image, and further comprising angular position adjustment means for adjusting the angular position of said first partial beam mirror and a piezo-ceramic device for a linear position adjustment of said second partial beam mirror.

31. The apparatus of claim 30, wherein said receiver elements and said modified Michelson interferometer are arranged in said scanning head.

32. The apparatus of claim 18, wherein said laser generator is a semiconductor laser arranged within said scanning head.

33. The apparatus of claim 18, further comprising an optical device for widening said laser beam, said optical device being arranged between said laser generator and said radiation intensity matrix.

34. The apparatus of claim 18, further comprising a light conductor fiber bundle arranged between said laser generator and said radiation intensity matrix.

* * * * *